US008875103B2

(12) United States Patent
Yun

(10) Patent No.: US 8,875,103 B2
(45) Date of Patent: Oct. 28, 2014

(54) METHOD OF TESTING MULTIPLE LANGUAGE VERSIONS OF A SOFTWARE SYSTEM USING ONE TEST SCRIPT

(75) Inventor: Gilly Yun, Beijing (CN)

(73) Assignee: CA, Inc., New York, NY (US)

( * ) Notice: Subject to any disclaimer, the term of this patent is extended or adjusted under 35 U.S.C. 154(b) by 815 days.

(21) Appl. No.: 12/778,691

(22) Filed: May 12, 2010

(65) Prior Publication Data

US 2011/0283261 A1    Nov. 17, 2011

(51) Int. Cl.
*G06F 9/44*     (2006.01)
*G06F 11/30*    (2006.01)
*G06F 11/36*    (2006.01)

(52) U.S. Cl.
CPC .......... *G06F 9/4448* (2013.01); *G06F 11/3684* (2013.01)
USPC .......................................... 717/124; 702/186

(58) Field of Classification Search
CPC ......... G06F 11/3688; G06F 8/24; G06F 8/36; G06F 17/20; G06F 17/289; G06F 9/4448; G05B 23/021; Y04S 10/54; H04L 29/0809; H04L 67/02
See application file for complete search history.

(56) References Cited

U.S. PATENT DOCUMENTS

| | | | | |
|---|---|---|---|---|
| 5,731,991 A | * | 3/1998 | Kinra et al. | 702/186 |
| 2007/0022407 A1 | * | 1/2007 | Givoni et al. | 717/124 |
| 2009/0049427 A1 | * | 2/2009 | Zhao | 717/127 |

\* cited by examiner

*Primary Examiner* — Hyun Nam
(74) *Attorney, Agent, or Firm* — Myers Bigel Sibley & Sajovec, P.A.

(57) ABSTRACT

A system and method for testing software systems having a plurality of linguistic versions is presented. The method comprises creating an initial test script in one linguistic version of the plurality of linguistic versions, executing and modifying this test script, and executing the modified initial test script in additional linguistic versions. Executing the initial test script can comprise performing test steps, and storing a result of each test step as log data in a log file, each test step usually having Windows controls to test. Modifying the initial test script can comprise recognizing the test step controls using the log data, performing the test step, and replacing the test step control text with another text. Alternatively, modifying the initial test script can comprise entering into a test step having a control text, recognizing the control based on the control attributes, performing the test step, and replacing the test step control text.

19 Claims, 7 Drawing Sheets

METHOD OF TESTING MULTIPLE LANGUAGE VERSIONS OF A SOFTWARE SYSTEM USING ONE TEST SCRIPT

FIELD OF THE INVENTION

The present disclosure relates generally to computer systems and software, and more particularly to a process for testing computer software.

BACKGROUND OF THE INVENTION

Computer software systems perform a variety of functions and include many diverse user interfaces that enable users to interact with the system. Different users can speak multiple languages, so that software systems often include distinct, non-English language versions of the software, each version having user interfaces that can interact with the user, that is, display instructions, information, data and other items, in one of several languages, such as French, Chinese, German, etc. Each particular language version of the software can be known as a "localized product", that is, a version of the software interacting with a user in the Chinese language is the Chinese "localized product".

Currently developers of these "multi-lingual" software systems with more than one localized product need to test each linguistic version separately and thoroughly, even though the underlying functions and processes of the software system are the same for the different languages. For example, in automated Graphical User Interface (GUI) testing of localized products, testing is done multiple times, one or more times for each of the several languages. Currently, each test in a specific language is performed with a test script in localized words. To obtain those localized test scripts, a scriptwriter must repeat the script creation job for each of the several languages by running each localized application. However, one problem with current technologies is that preparing multiple localized test scripts is time consuming and error-prone.

It would be desirable to provide a method for testing multilingual software in each of the multiple languages that can be performed without a separate test script for each language.

BRIEF SUMMARY OF THE INVENTION

A novel system and method for testing software systems having versions in multiple languages is presented. The inventive method involves testing any one language first, with a test script, and collecting GUI information while performing the test. Next, test the other languages with the same test script, as opposed to a new test script as required in the prior art, and with GUI information log file that contains no localized words but only GUI data which can be used to find the right control.

An inventive method for testing software systems having a plurality of linguistic versions is presented. The method comprises creating an initial test script in one linguistic version of the plurality of linguistic versions, executing the initial test script in the one linguistic version, modifying the initial test script, and executing the modified initial test script in one or more linguistic versions in addition to the one linguistic version. In one embodiment, executing the initial test script comprises performing one or more test steps, and storing a result of each test step as log data in a log file, wherein each test step has a control with a text. In one embodiment, modifying the initial test script comprises, for each test step: entering into the test step, recognizing the test step control using the log data in the log file, performing the test step, and replacing the test step control text with a different text. The different text can be generic text or text in the language of the linguistic version. In one embodiment, modifying the initial test script comprises entering into a test step having a control with a text, recognizing the control based on control attributes, performing the test step, and replacing the test step control text with generic text or text in the language of the linguistic version.

A system for testing multiple languages in one test script, in one aspect, may include a processor and a server module operable to execute on the processor. The server module may be operable to create an initial test script in one linguistic version of the plurality of linguistic versions, execute the initial test script in the one linguistic version, modify the initial test script, and execute the modified initial test script in one or more linguistic versions in addition to the one linguistic version. The server module may be further operable to perform one or more test steps, and store a result of each test step as log data in a log file, wherein each test step has a control with a text. The server module may be further operable to perform, for each test step, entering into the test step, recognizing the test step control using the data in the log file or using control attributes, performing the test step, and replacing the test step control text with generic text or text in the language of the linguistic version.

A computer readable storage medium storing a program of instructions executable by a machine to perform one or more methods described herein also may be provided.

BRIEF DESCRIPTION OF THE DRAWINGS

Further features as well as the structure and operation of various embodiments are described in detail below with reference to the accompanying drawings. In the drawings, like reference numbers indicate identical or functionally similar elements.

DETAILED DESCRIPTION

A novel system and method for testing software systems having versions in multiple languages is presented. In this inventive approach, each localized version of the software system should have the same layout. Typically the layouts are the same among the different versions because they are compiled by one source, with only the string resource files being different.

Figure 1:
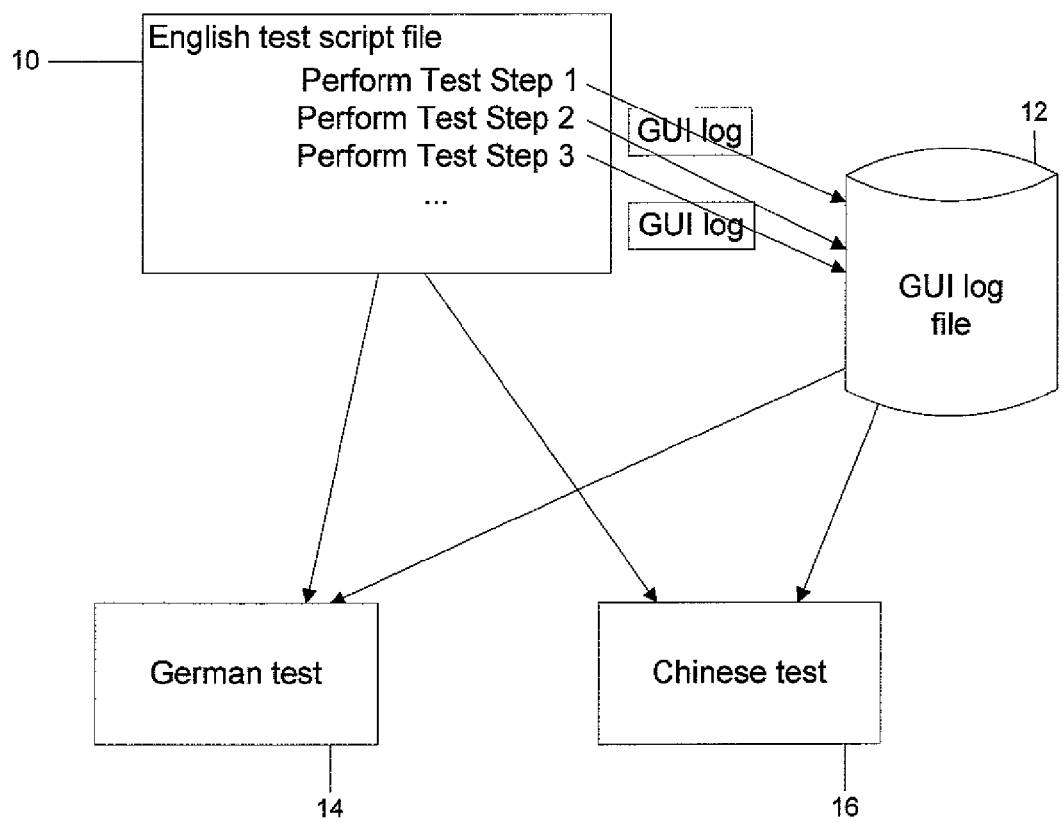
FIG. 1 is a schematic diagram of an embodiment of the present invention.

FIG. 1 shows a schematic diagram of the invention. Test step 1, test step 2, test step 3, etc., are performed using the English language test script file 10. Each test step tests a control, usually a Windows® control such as a Button, Edit, Combobox, Tab, Slidebar, Tree, List, etc., and the control in the test step has text in the testing language. In the embodiment shown in FIG. 1, the English language test script file 10 has control text in the English language. In FIG. 1, during the English language testing, that is, the execution of the English language test script file 10, a GUI log file 12 is created. This GUI log file 12 can be used to perform other language tests such as the German test 14 and the Chinese test 16. Other embodiments without the GUI log file 12 can be used.

In an exemplary embodiment, a test script 10, depicted in English, can include the following steps:
Step 1. click "Next" button
Step 2. click "Next" button
Step 3. click "No" button
Step 4. select "Install" at Combobox
...
And the following log data 12 will be generated from these steps:
1. button: 1
2. button: 2
3. button: 1
4. Combobox: 1:3
...
This log data 12 can be applied to any other language test because there is no language specific text. For example, if the test is run in German, the above English test script 10 will be used with the log data 12 as follows:
Step 1. click "Next" button→click $1^{st}$ button (the label would be "Nächster")
Step 2. click "Next" button→click $2^{nd}$ button
Step 3. click "No" button→click $1^{st}$ button (the label would be "Nein")
Step 4. select "Install" at Combobox→select $3^{rd}$ item from $1^{st}$ combobox (the string would be "Installieren")
In one embodiment, a translated German test script 14 would be produced as a byproduct after the test script is run. This translated test script would be:
Step 1. click "Nächster" button
Step 2. click "Nächster" button
Step 3. click "Nein" button
Step 4. select "Installieren" at Combobox
The German test with the English test script 10 and the log data 12 can be saved, and/or the German script 14 can be saved, depending on the test style or user preference. If using the English test script and the log data is more accurate, then keeping these is preferred.

Figure 2:
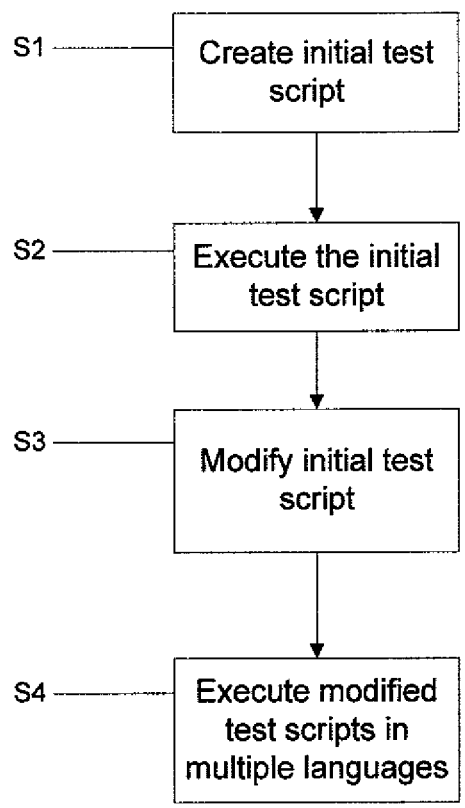
FIG. 2 is a flow diagram illustrating a method for testing multiple languages in one test script.

FIG. 2 is a flow diagram of the inventive method. Steps of the procedure are as follows. First, in step S1, create an initial test script in one language, e.g., a localized language test, for testing the multi-lingual software. In one embodiment, this test script is prepared in the English language. Any language of the multiple languages supported by the software can be used for the initial test script. Execute the initial test script in step S2, using debugging or testing software, such as iPAF by CA. Edit and/or modify the initial test script in step S3, in accordance with the log file if available, and execute the modified test script in each of the other languages in step S4. In one embodiment, a generic test script can be created. In another embodiment, a test script can be generated in the language of the test.

Figure 3:
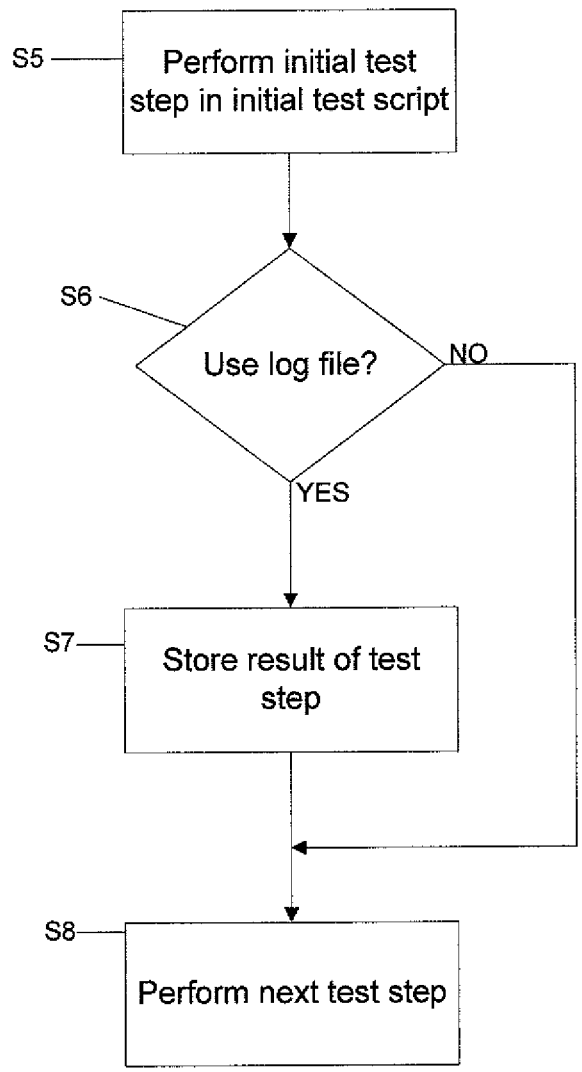
FIG. 3 is a flow diagram illustrating the initial testing step in one embodiment of the present invention.

FIG. 3 is a flow diagram of the execution of the initial test script (step S2) in a particular language, e.g., English. In step S5, perform the initial test step, e.g., test step 1, in the initial test script. For example, test step 1 can test the "save" button on a GUI window, that is, test step 1 determines the result of clicking on the "save" button in a particular GUI window of the English version of the multi-lingual software being tested. If a log file is to be generated (S6=YES), the result of clicking on the "save" button is stored in this log file in step S7. If no log file is requested (S6=NO), step S7 is skipped. The execution of the initial test script continues with the processing of the next test step, in step S8, and, if the log file is generated (S6=YES), storing results in the log file in step S7, until all test steps in the initial test script are performed.

Accordingly, if the initial test script is executed with a log feature, e.g., step S6=YES, the execution of the initial test script produces a log file comprising the results of each of the test steps in the test script.

Figure 4:
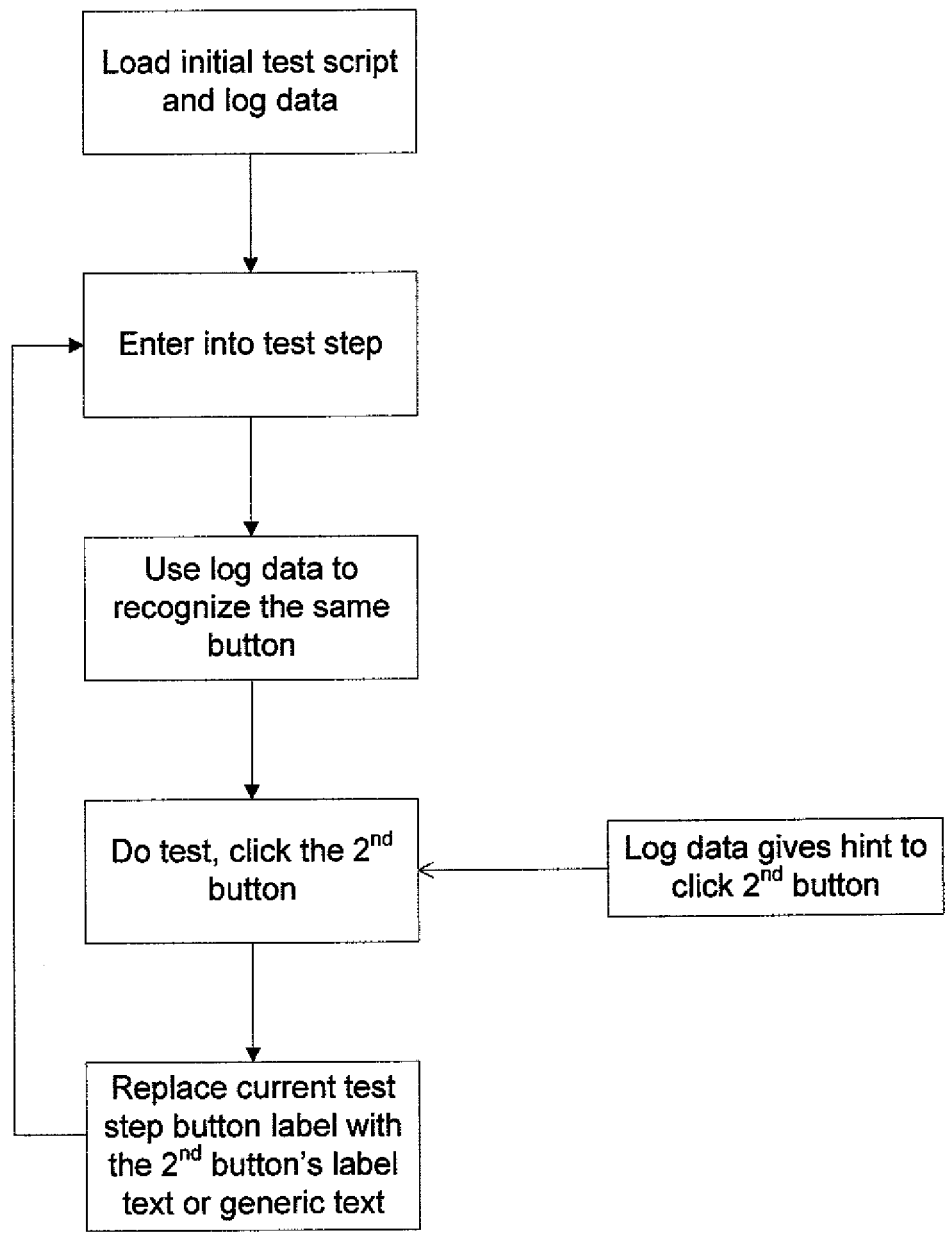
FIG. 4 is a flow diagram illustrating the method after the initial testing step in one embodiment of the present invention.

FIG. 4 is a flow diagram of the modification of the initial test script (step S3) when a log file exists. When the log file exists, it is applied to the initial test script to create a generic test script in which "localized words" of the initial language, such as English button titles of "BACK", "NEXT", "CANCEL", are removed from the initial test script and replaced with localized words of the language to be tested, such as German button titles of "ZURÜCK", "WEITER", "ABBRECHEN". Next, the generic test script is executed with the edited log file data. The inventive method for editing the log file can be based on a series of factors used to determine whether a "command" or "button" is a localized word, and, if so, how this word should be converted to another localized word in another language.

In another embodiment, such as when no log file exists, the initial "localized words" can be replaced with generic names such as "first button", "second button", "third button", and/or "first tab", "second tab", etc. One technique for determining whether a command, e.g., a button label, tab header, etc., is control text of a localized word is to look at the control's attributes, such as class name, parent class name, role number, index, location, button's status, etc. Other factors and/or control attributes can also be used.

Figure 5:
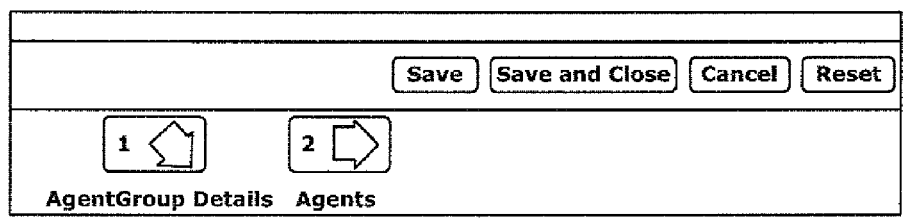
FIG. 5 is an example of a GUI interface screen in a particular language.

An example is shown in accordance with the GUI interface screen shown in FIG. 5. If the initial test script includes the test step "Click 'Cancel'" button, then during the execution of the test script, the 'Cancel' button will be logged as the third button. This is just a technical index number based on the typical approach which is that the inventive system or tool calls a function, and returns all the control elements in a specific order, usually from top-left to right-bottom. Accordingly, as shown in FIG. 5, the first button is Save, the second is Save and Close, the third is Cancel and the fourth is Reset. In addition, the fifth is AgentGroup Details and the sixth is Agents. Because the multi-lingual software is obtained from the same source code, the buttons maintain the same functionality but have labels or text, e.g., strings, based on the user interface language. The order of the elements in the layout does not matter, e.g., the order could be Cancel, Save, Save and Close, Reset, etc.; the inventive tool records the order (index and some additional information) and finds the same style or layout in other languages.

Figure 6:
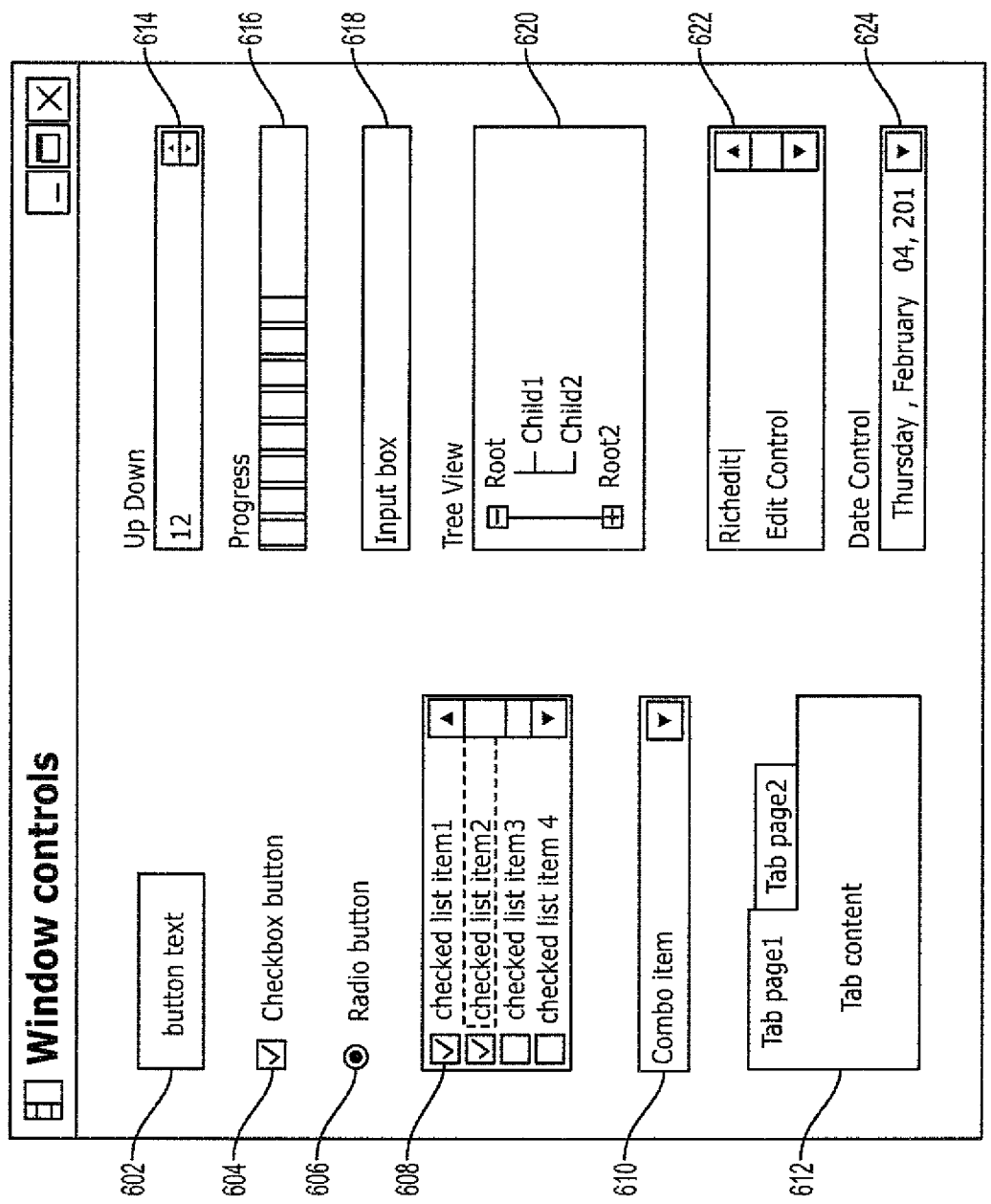
FIG. 6 is an example of a GUI interface screen with Windows® controls.
Figure 7:
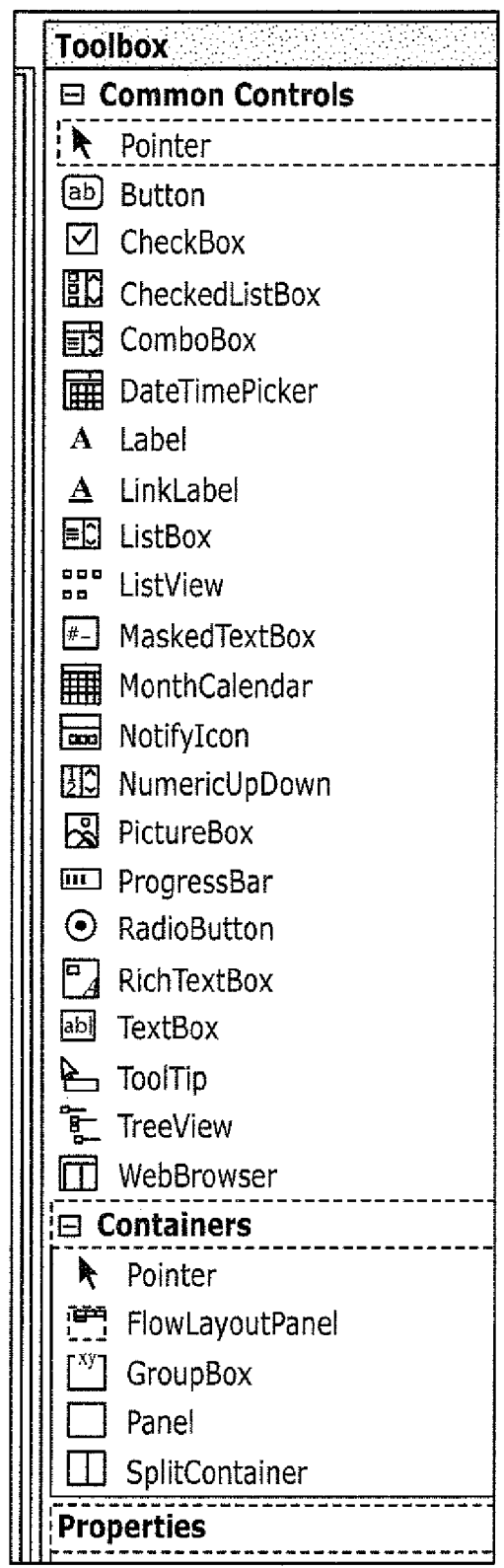
FIG. 7 is an example of common GUI controls and containers.

FIG. 6 is an example of a Sample English language GUI, illustrating various Windows® controls. FIG. 6 shows a button 602, a checkbox 604, radio buttons 606, a List control 660, a Combo or combobox 610, tabs or tab content 612, an UpDown control 614, a progress bar 616, an input box 618, a tree view 620, an edit control 622, and a date control expandable into a calendar 624. Other types of controls and/or containers, for example those shown in FIG. 7, can also be used.

Hence, a key point of this inventive method is that it tries to figure out controls (click points) without words but with control's attributes, such as class name, parent class name, role number, index, etc. For example, when there are two buttons labeled in English in a window or GUI, these buttons can be identified in other languages as "the first button" and "the second button" without localized words of the button labels. If it was the second button that clicked in English test script, then the second button is also clicked on in other languages.

Advantageously, this inventive system and method saves time that would otherwise be spent creating and translating and maintaining test scripts in several languages. The time saving is achieved by working with only one language of test script and GUI log file. Only one (usually English) test script must be created and this can be used, together with GUI log file generated during the initial testing, for testing on each of the other languages. There is no translation necessary to obtain test scripts in other languages. In addition, maintenance is minimized in that for new builds of the software under test, only one test script must be updated.

Further, consistency of testing is achieved. Because the same test scripts are executed on GUIs of all tested languages, exactly the same tests are run for all languages. In contrast, when creating individual test scripts for each language, there is the danger that the test scripts are different and/or inconsistent, especially when different quality assurance people are automating the testing on different languages.

An example of test script with German and English follows.

```
German:
    <GUIMAPITEM>
        <No>step1</No>
        <Object>Button</Object>
        <Action>Click</Action>
        <Content>Ja</Content>
        <Window>Hallo Welt</Window>
        <Index />
    </GUIMAPITEM>
English:
    <GUIMAPITEM>
        <No>step1</No>
        <Object>Button</Object>
        <Action>Click</Action>
        <Content>Yes</Content>
        <Window>Hello World</Window>
        <Index />
    </GUIMAPITEM>
```

The actions are the same; only localized words are different. So creating localized test scripts is a very redundant job without any creative work happening by the efforts.

The GUI log file could be generated as in the following example:

```
<GUIMAPITEM>
    <No>step1</No>
    <Object>Button</Object>
    <Action>Click</Action>
    <WindowClassPath>#32770</WindowClassPath>
    <ControlClassPath>#32770|Button</ControlClassPath>
    <Location>13,182</Location>
    <ControlIndex>1/2</ControlIndex>
    <ControlCount>2</ControlCount>
    <ControlID>11</ControlID>
</GUIMAPITEM>
```

This GUI log file compares the button's index and class names to find it in German or any other languages; it does not require any localized words. When the control is found, the button's label, e.g., localized word(s), is obtained and the English test script is updated with corresponding localized words, so automatically translated test scripts can be used directly in localized test. In the alternative, as described above, the English test script plus GUI log file can be used for testing.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims. While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A method for testing software systems having a plurality of linguistic versions, comprising:
    creating an initial test script in a first linguistic version of the plurality of linguistic versions;
    executing the initial test script in the first linguistic version;
    modifying the initial test script by removing an indication of the first linguistic version therefrom; and
    executing the modified initial test script in a second linguistic version of the plurality of linguistic versions different than the first linguistic version,
    wherein executing the initial test script comprises:
    performing a plurality of test steps, wherein each test step comprises a test step control and a test step control text in accordance with the first linguistic version; and
    storing a result of each test step in a log file indicating a control attribute of the test step control, wherein the control attribute is free of language-specific text.

2. The method according to claim 1, wherein modifying the initial test script comprises, for each test step:
    entering into the test step;

recognizing the test step control using the control attribute indicated by the log file;
performing the test step; and
replacing the test step control text with a different text.

3. The method according to claim 2, wherein the different text is a generic text or a text in accordance with the second linguistic version.

4. A method for testing software systems having a plurality of linguistic versions, comprising:
creating an initial test script in a first linguistic version of the plurality of linguistic versions;
executing the initial test script in the first linguistic version;
modifying the initial test script by removing an indication of the first linguistic version therefrom; and
executing the modified initial test script in a second linguistic version of the plurality of linguistic versions different than the first linguistic version,
wherein modifying the initial test script comprises:
entering into a test step having a test step control with a test step control text in accordance with the first linguistic version;
recognizing the test step control using log data indicative of an attribute;
performing the test step; and
replacing the test step control text with a different text.

5. The method according to claim 4, wherein the different text is a generic text or a text in accordance with the second linguistic version.

6. The method according to claim 4,
wherein the attribute corresponds to the test step control;
and wherein replacing the test step control text comprises:
replacing the test step control text with a generic text or a text in accordance with the second linguistic version.

7. A system for testing software systems having a plurality of linguistic versions, comprising:
a processor circuit; and
a server module operable to execute on the processor circuit, and further operable to create an initial test script in a first linguistic version of the plurality of linguistic versions, execute the initial test script in the first linguistic version, modify the initial test script by removing an indication of the first linguistic version therefrom, and execute the modified initial test script in a second linguistic version of the plurality of linguistic versions different than the first linguistic version,
wherein the server module is operable to execute the initial test script by:
performing a plurality of test steps, wherein each test step comprises a test step control and a test step control text in accordance with the first linguistic version; and
storing a result of each test step in a log file indicating a control attribute of the test step control, wherein the control attribute is free of language-specific text.

8. The system according to claim 7, wherein the server module is operable to modify the initial test script by, for each test step:
entering into the test step;
recognizing the test step control using the control attribute indicated by the log file;
performing the test step; and
replacing the test step control text with a different text.

9. The system according to claim 8, wherein the different text is a generic text or a text in accordance with the second linguistic version.

10. A system for testing software systems having a plurality of linguistic versions, comprising:
a processor circuit; and
a server module operable to execute on the processor circuit, and further operable to create an initial test script in a first linguistic version of the plurality of linguistic versions, execute the initial test script in the first linguistic version, modify the initial test script by removing an indication of the first linguistic version therefrom, and execute the modified initial test script in a second linguistic version of the plurality of linguistic versions different than the first linguistic version,
wherein the server module is operable to modify the initial test script by:
entering into a test step having a test step control with a test step control text in accordance with the first linguistic version;
recognizing the test step control using log data indicative of an attribute;
performing the test step; and
replacing the test step control text with a different label.

11. The system according to claim 10, wherein the different text is a generic text or a text in accordance with the second linguistic version.

12. The system according to claim 10,
wherein the attribute corresponds to the test step control;
and wherein replacing the test step control text comprises:
replacing the test step control text with a generic text or a text in accordance with the second linguistic version.

13. A non-transitory computer readable storage medium storing a program of instructions executable by a machine to perform a method for testing software systems having a plurality of linguistic versions, comprising:
creating an initial test script in a first linguistic version of the plurality of linguistic versions;
executing the initial test script in the first linguistic version;
modifying the initial test script by removing an indication of the first linguistic version therefrom; and
executing the modified initial test script in a second linguistic version of the plurality of linguistic versions different than the first linguistic version,
wherein executing the initial test script comprises:
performing a plurality of test steps, wherein each test step comprises a test step control and a test step control text in accordance with the first linguistic version; and
storing a result of each test step in a log file indicating a control attribute of the test step control, wherein the control attribute is free of language-specific text.

14. The medium according to claim 13, wherein modifying the initial test script comprises, for each test step:
entering into the test step;
recognizing the test step control using the control attribute indicated by the log file;
performing the test step; and
replacing the test step control text with a different text.

15. The medium according to claim 14, wherein the different text is a generic text or a text in accordance with the second linguistic version.

16. A non-transitory computer readable storage medium storing a program of instructions executable by a machine to perform a method for testing software systems having a plurality of linguistic versions, comprising:
creating an initial test script in a first linguistic version of the plurality of linguistic versions;
executing the initial test script in the first linguistic version;
modifying the initial test script by removing an indication of the first linguistic version therefrom; and
executing the modified initial test script in a second linguistic version of the plurality of linguistic versions different than the first linguistic version, wherein modifying the initial test script comprises:
entering into a test step having a test step control with a test step control text in accordance with the first linguistic version;
recognizing the test step control using log data indicative of an attribute;
performing the test step; and
replacing the test step control text with a different text.

17. The medium according to claim 16,
wherein the attribute corresponds to the test step control; and wherein replacing the test step control text comprises:
replacing the test step control text with a generic text or a text in accordance with the second linguistic version.

18. A method for testing software systems having a plurality of linguistic versions, comprising:
creating an initial test script in a first linguistic version of the plurality of linguistic versions;
executing the initial test script in the first linguistic version:
modifying the initial test script by removing an indication of the first linguistic version therefrom; and
executing the modified initial test script in a second linguistic version of the plurality of linguistic versions different than the first linguistic version,
wherein removing the indication of the first linguistic version comprises:
recognizing the indication of the first linguistic version in the initial test script as a localized word corresponding to a command, wherein the localized word is in a language of the first linguistic version; and
removing the localized word from the initial test script responsive to the identifying,
and wherein modifying the initial test script further comprises:
replacing the localized word in the language of the first linguistic version with a generic name corresponding to the command or with a localized word corresponding to the command in a language of the second linguistic version.

19. The method of claim 18, further comprising:
generating a log file including log data corresponding to results of executing the initial test script in the first linguistic version, wherein the log data indicates an attribute of the command that is free of the localized word in the language of the first linguistic version,
wherein replacing the localized word in the language of the first linguistic version comprises:
determining the localized word corresponding to the command in the language of the second linguistic version based on the attribute thereof indicated by the log data; and then
replacing the localized word for the command in the language of the first linguistic version with the localized word for the command in a language of the second linguistic version.

* * * * *